March 5, 1957 J. BESKID 2,783,848
OIL DRIP CATCHER FOR AUTOMOTIVE VEHICLES
Filed Aug. 13, 1954

*INVENTOR.*
*JOHN BESKID*
BY Fulwider Mattingly
 Huntley
*ATTORNEYS.*

United States Patent Office 2,783,848
Patented Mar. 5, 1957

2,783,848

OIL DRIP CATCHER FOR AUTOMOTIVE VEHICLES

John Beskid, Los Angeles, Calif.

Application August 13, 1954, Serial No. 449,557

1 Claim. (Cl. 180—69.1)

The invention relates generally to the automotive field and more particularly to a new and novel drip catcher for use with automotive vehicles.

It is well known that oil and grease droplets will fall from various parts of an automobile's engine and its transmission while the automobile is at rest. Such oil and grease will gather in a pool beneath the automobile and this pool presents an unattractive appearance upon the pavement of the garage, driveway or street whereon the automobile has been parked. The pool also gives rise to a serious fire hazard, especially in a closed garage. Additionally, where the pool gathers upon the surface of an asphalt pavement, such pavement will often be damaged thereby.

In order to prevent such oil and grease from accumulating upon a garage floor, a large metallic pan is often positioned upon the floor below the location normally occupied by the automobile. Although such a pan will catch the oil and grease droplets, its presence upon the garage floor presents a cluttered and messy appearance. Moreover, a definite fire hazard is presented by this oil and grease-covered pan.

A major object of the present invention is to provide a novel oil and grease drip catcher that is secured to the automobile itself. This drip catcher completely eliminates the need of a floor-located pan.

Another object of the invention is to provide an oil and grease drip catcher that is readily attachable to and removable from any common type of automobile.

A further object is to provide a drip catcher of the aforedescribed nature which will not rattle during the operation of the automobile to which it is secured.

An additional object is to provide a drip catcher having a container wherein is disposed absorbent material capable of absorbing the oil and grease which falls into the drip catcher, said absorbent material being easily replaceable when it becomes saturated.

Yet another object is to provide a drip catcher of the aforedescribed nature which is simple in design and rugged of construction whereby it may afford a long and trouble-free service life.

It is a further object of the invention to provide a drip catcher which when installed upon an automobile will not be visible to the casual observer.

It is a still further object to provide a drip catcher which may be manufactured at low cost whereby it will be available to a large number of users.

These and other objects and advantages of the present invention will become more apparent from the following detailed description of a preferred embodiment thereof, when taken in conjunction with the appended drawings wherein.

Figure 1:
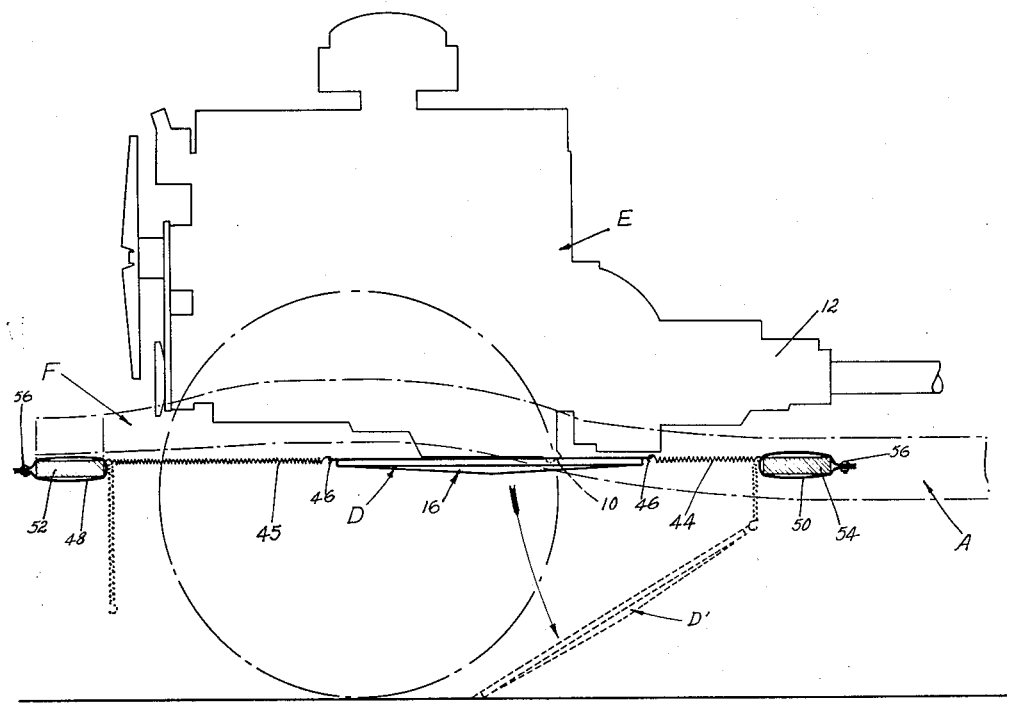
Figure 1 is a side view showing a drip catcher embodying the present invention attached to an automobile.

Referring to the drawings, the preferred form of drip catcher D embodying the present invention is shown mounted below the front portion of a conventional automotive vehicle A having an engine E and frame F. When mounted in the position shown in this figure, the drip catcher will be adpated to receive oil and grease droplets falling from the engine's crank case drain plug 10, the engine's rear bearing area and at least a portion of the engine's transmission 12.

Figure 2:
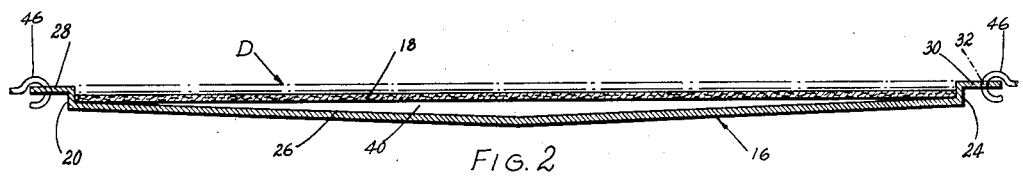
Figure 2 is a central vertical sectional view of said drip catcher.
Figure 3:
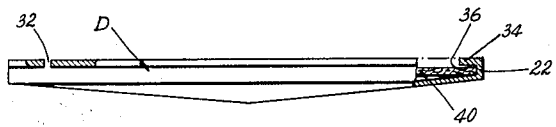
Figure 3 is an end view of said drip catcher, taken partly in vertical section.

Referring to Figures 2 and 3 for a more detailed showing of the drip catcher D, the latter includes an open-topped metallic container, generally designated 16, and a rectangular sheet of absorbent material 18 disposed within the confines of the container. The container 16 is of integral construction and includes a front wall 20, a pair of side walls 22, a rear wall 24 and a downwardly-dished bottom wall 26. The latter affords considerable rigidity to the container 16 and also lends itself to economical construction. The upper end of the front wall 20 is formed with a forwardly extending flange 28, while the upper end of the rear wall 24 is likewise formed with a rearwardly extending flange 30. These flanges 28 and 30 are each formed with a pair of vertical bores 32 at points spaced substantially equidistantly inwardly from the sidewalls 22. The purpose of these vertical bores 32 will be set forth hereinafter. The upper ends of the side walls 22 are each formed with an inwardly extending flange 34. The flanges 34 define a longitudinally extending pocket 36 along each side of the container 16.

The sheet of absorbent material 18 is somewhat smaller in outline than the distance between the vertically extending walls of the container 16. This sheet 18 may be formed of any suitable substance capable of absorbing oil and grease, as for example porous paperboard. The sides of the sheet 18 are disposed within the pockets 36 defined between the underside of the flanges 34 and the side portion of the bottom wall 26, as shown in Figure 3. It should be particularly noted that a space 40 exists between the underside of the sheet 18 and the upper surface of the bottom wall 26, as shown in Figure 2.

The drip catcher D is adapted to be secured below the automobile by two pairs of tension springs 44 and 45, respectively, the springs having a hook 46 formed at each of their ends. These hooks 46 extend through the vertical bores 32 formed in the front and rear flanges 28 and 30 and suitable apertures (not shown) formed in front and rear clamp elements 48 and 50, respectively, that are in turn secured to the transverse members 52 and 54 of the frame F. Preferably, the clamp elements 48 and 50 are of a quick-connecting type which are adjustable as to size, and which may be installed in a minimum amount of time and with a limited amount of labor.

In order to install the drip catcher D embodying the present invention, the front and rear clamps 48 and 50 are affixed to the frame members 52 and 54 by means of set screws 56. One end of each of the springs 44 and 45 are preferably secured to the clamps before the latter are affixed to these frame members. The opposite ends of the springs will then be inserted through the bores 32 of the front and rear flanges 28 and 30 of the container 16. The drip catcher will then be ready for use and it should be noted that the springs 44 and 45 retain it against the underside of the engine E with considerable force. Accordingly, the drip catcher will not tend to rattle even when the vehicle is driven over rough surfaces.

As oil and grease droplets fall into the container 16 they will be absorbed by the sheet of absorbent material 18. When this sheet has been saturated it may be replaced with a fresh counterpart, the old sheet being discarded. In order to accomplish such replacement, one end of the container 16 may be lowered, as indicated in Figure 1, by removing the hooks 46 of the front springs 44 from the vertical bores 32 formed in the front flange 28. The front of the drip catcher will then rest against the ground as indicated at D¹ and access will then be provided to the interior of the container. The sheet 18 may then be replaced. Should it occur that an excessive quantity of oil and grease flows into the container before the sheet 18 is replaced, such excess will drop into the space 40 below the sheet 18. Hence, this space 18 constitutes a reservoir for receiving such excess oil and grease.

It should be observed that the drip catcher D when installed is disposed completely out of sight of the casual observer. Additionally, inasmuch as it presents a very flat angle relative to the air passing underneath the vehicle, the drip catcher will not be adversely affected by the high velocity air stream created when the vehicle is moving at higher speeds. Although the drip catcher D has been shown and described in conjunction with a vehicle of the automotive type it is also well adapted for use with trucks and buses.

While there has been shown and described hereinbefore what is presently considered to be the preferred embodiment of the present invention, it will be apparent that various modifications and changes may be made thereto without departing from the spirit of the invention or the scope of the appended claim.

I claim:

A drip catcher for use with an automotive vehicle having a frame, comprising: an open-topped container having a front wall, a rear wall, a pair of side walls and a downwardly dished bottom wall; an inwardly extending flange formed along the upper ends of said side walls so as to define a longitudinal pocket at each side of said container; a forwardly extending flange formed at the upper end of said front wall; a rearwardly extending flange formed at the upper end of said rear wall; a pair of vertical bores formed in said front and rear flanges, said bores being spaced equidistantly inwardly from each side thereof; a sheet of absorbent material removably disposed within said pockets, a reservoir being defined between the underside of said sheet and the upper surface of said bottom wall; a pair of clamps securable to the front portion of said frame; a second pair of clamps securable to said frame rearwardly of said first pair of clamps; and, a tension spring secured to each of said clamps, the opposite end of said springs each being formed with a hook that engages one of said bores, said springs urging said container upwardly into engagement with the underside of said vehicle whereby said container will not tend to rattle.

References Cited in the file of this patent

UNITED STATES PATENTS

| | | |
|---|---|---|
| 572,641 | Kriner | Dec. 8, 1896 |
| 646,283 | Heatly et al. | Mar. 27, 1900 |
| 971,550 | Mullins | Oct. 4, 1910 |
| 1,094,210 | Hughes | Apr. 21, 1914 |
| 1,129,390 | Hicks | Feb. 23, 1915 |
| 1,163,317 | Brush | Dec. 7, 1915 |